United States Patent
Hall et al.

(10) Patent No.: US 10,220,342 B2
(45) Date of Patent: Mar. 5, 2019

(54) GRADUATED FILTERING ASSEMBLY

(71) Applicants: David R. Hall, Provo, UT (US); Grant Getts, Provo, UT (US); Seth Myer, Eagle Mtn., UT (US)

(72) Inventors: David R. Hall, Provo, UT (US); Grant Getts, Provo, UT (US); Seth Myer, Eagle Mtn., UT (US)

(73) Assignee: Hall Labs LLC, Provo, UT (US)

( * ) Notice: Subject to any disclaimer, the term of this patent is extended or adjusted under 35 U.S.C. 154(b) by 136 days.

(21) Appl. No.: 15/374,266

(22) Filed: Dec. 9, 2016

(65) Prior Publication Data
US 2018/0161714 A1 Jun. 14, 2018

(51) Int. Cl.
| | | |
|---|---|---|
| B01D 29/56 | (2006.01) |
| B01D 35/30 | (2006.01) |
| B01D 46/00 | (2006.01) |
| B01D 46/12 | (2006.01) |
| B01D 29/085 | (2006.01) |

(52) U.S. Cl.
CPC ..... *B01D 46/0023* (2013.01); *B01D 46/0005* (2013.01); *B01D 46/0009* (2013.01); *B01D 46/0013* (2013.01); *B01D 46/12* (2013.01)

(58) Field of Classification Search
CPC .... B01D 46/008; B01D 29/085; B01D 29/56; B01D 46/0009; B01D 46/0013; B01D 29/62; B01D 46/0023; B01D 35/30; B01D 2201/304; B01D 2271/02
USPC .... 210/323.1, 330, 335, 347, 314, 231, 252, 210/255, 262, 290, 445, 476, 486, 490, 210/195.1, 300, 301, 532.1, 536, 538, 540
See application file for complete search history.

(56) References Cited

U.S. PATENT DOCUMENTS

| | | | | |
|---|---|---|---|---|
| 1,350,521 A | * | 8/1920 | Roots | ..... B01D 35/00 210/182 |
| 5,958,239 A | * | 9/1999 | Sing | ..... C02F 3/02 210/150 |

* cited by examiner

*Primary Examiner* — Madeline Gonzalez

(57) ABSTRACT

In various example embodiments, a graduated filtering assembly is disclosed. The graduated filtering assembly comprises a filter module that is inserted into a receiving duct. A series of filters of graduating sizes are contained inside the filter module. Each of the filters are inside filter trays which allow them to be removed and replaced when needed. The filtering assembly filters either liquid or gas fluids.

17 Claims, 15 Drawing Sheets

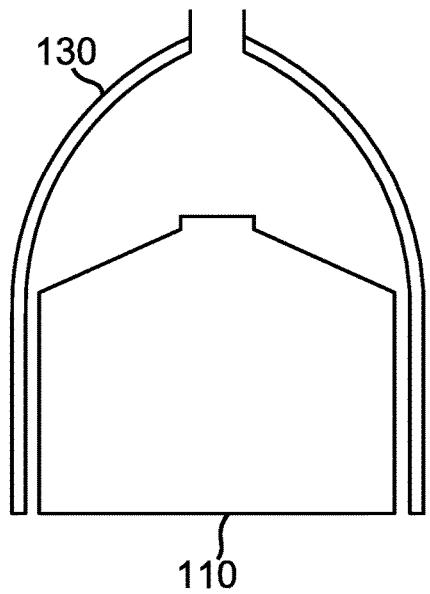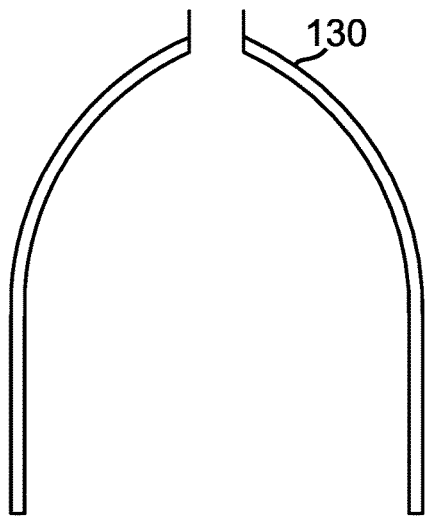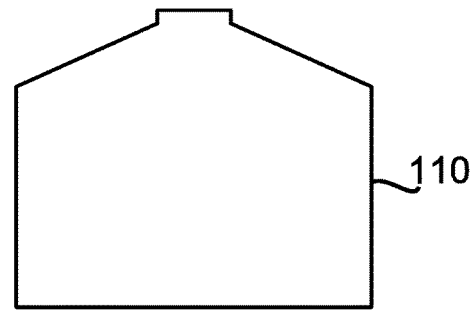
FIG. 2A  FIG. 2B

GRADUATED FILTERING ASSEMBLY

FIELD OF THE INVENTION

This invention generally relates to filtering systems and more specifically to filter modules comprising multiple filter elements within an enclosure.

BACKGROUND OF THE INVENTION

Filtering systems are designed to provide protection to users from hazardous or toxic fumes or particulates in gas or liquid fluids by filtering contaminated particles from the fluid, allowing them to be removed by disposing of a dirty filter or by cleaning the contaminates from the filter. In most cases, the main filter removes larger particles, then subsequent filters remove finer particles from the fluid.

Some filtering systems include a filter module that contains a series of multiple filters, each removing different types or sizes of contaminated particles. Many of these systems may be modular with respect to the filters, allowing them to be replaced. However, there may not be a system that provides graduating sizes of filters to be utilized as required for the varying purposes or functions served by each filtering section. A series of various filter sizes is needed to allow more filter surface area for the finer contaminated particles as the fluid to be filtered passes through a series of filters.

A system that allows each disposable filter element to be placed inside a structure or tray is also needed, allowing the filter elements to be replaced as needed. Having the complete filter system containing multiple filter elements within a filter module would further simplify the process of maintenance when filters need to be replaced by allowing the maintenance to be done on the removable module rather than in a fixed assembly or system. In some cases, the assembly or system may be in a location that is difficult to reach, or in an awkward location.

SUMMARY

This invention has been developed in response to the present state of the art and, in particular, in response to the problems and needs in the art that have not yet been fully solved by currently available systems and methods. Features and advantages of different embodiments of the invention will become more fully apparent from the following description and appended claims, or may be learned by practice of the invention as set forth hereinafter.

Consistent with the foregoing, a graduated filtering assembly is disclosed. The filtering assembly comprises a graduated filtering assembly is disclosed. The graduated filtering assembly comprises a filter module that is inserted into a receiving duct. A series of filters of graduating sizes are contained inside the filter module. Each of the filters are inside filter trays which allow them to be removed and replaced when needed. The filtering assembly filtering either liquid or gas fluids.

The filtering assembly includes a filter module; the filter module comprised of one or more filter trays which each receive insertion of a filter element. Each of the filter trays are of graduated sizes, with larger filter trays stacked on top of smaller filter trays within the filter enclosure. A receiving duct receives the insertion of the filter module.

In one embodiment, a first filter tray at an entrance of fluid flow into the filter module is at least 3 times the depth of the other one or more filter trays, allowing the insertion of a filter element with at least 2 times the surface area of any of the other filter elements.

In another embodiment, a supporting frame of a first filter element at an entrance of fluid flow into the first filter module consists of a hinged support flange which supports the first filter element, supported by a clasp. The clasp can then be unclasped, releasing the support flange and allowing it to drop down which in turn allows the first filter element to be removed and replaced.

In an embodiment of the receiving duct, the duct includes a tapered, funnel shaped frame at one end of the receiving duct with a non-porous gasket material forming a seal between the funnel shaped frame and the filter enclosure when inserted therein. The filter module is placed into the receiving duct through an opening in the end opposite of the funnel shaped frame, and supported by an adjustable frame. The adjustable frame is adjusted to place pressure on the filter module, forcing it against the funnel shaped frame, forming a seal between the funnel shaped frame and the filter module.

Each of the filter trays in another embodiment, include a friction fitted frame within the filter tray holding the filter element in place, forming a seal between the filter tray and the filter element and adjusting to the filter depth, along with gaskets between the filter element and filter tray and gaskets between the filter trays. The friction fitted frame may also include screws attaching the frame to the filter tray providing a more secure attachment.

The non-porous gasket comprising materials from the group of one or more materials: neoprene, silicone, polytetrafluoroethylene, ethylene propylene diene monomer, and polyurethane. The filter element consisting of one or more of the following type of filters: fiberglass, polyester, HEPA, carbon, membrane, grease, and baffle.

In yet another embodiment the filter module may further include: a keystone strut channel supporting two of the filter trays adjacent to the gasketed interface surface allowing flow through both filters and into the funnel shaped frame. Along with a clasped framing structure that attaches the filter trays to the filter module, the clasped framing structure comprising gasket material on a surface contacting the filter trays, and clasps that secure the clasped framing structure to the filter module. The keystone strut channel may also be removeable, facilitating the removal and replacement of filters. If fixed to the filter module, the opening between the keystone strut channel and the adjacent sides of the filter module is wide enough to allow the removal and replacement of the filter trays and filters inside the filter enclosure.

In one embodiment of the filtering assembly, the receiving duct allows fluid flow into the funnel shaped frame and into a fluid flow driver device, the fluid flow driver device may be a pump or a fan or an individual's lungs in the case of a personal air filter mask application of the filtering assembly. The fluid flow driver may be detachable from the funnel shaped frame allowing maintenance of the device.

The filters may include pre-filtration filters in one or more of the frames; and main filtration filters in one or more of the frames. The filters may also be disposable filters allowing them to be replaced as required.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2A shows the filter module in place after it has been inserted inside the receiving duct, according to one example embodiment.

FIG. 2B shows the filter module after it has been removed from the receiving duct, according to one example embodiment.

DETAILED DESCRIPTION OF THE DRAWINGS

The description that follows includes various apparatus, systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments, an assembly as described herein comprises a graduated filtering assembly. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

Figure 1:
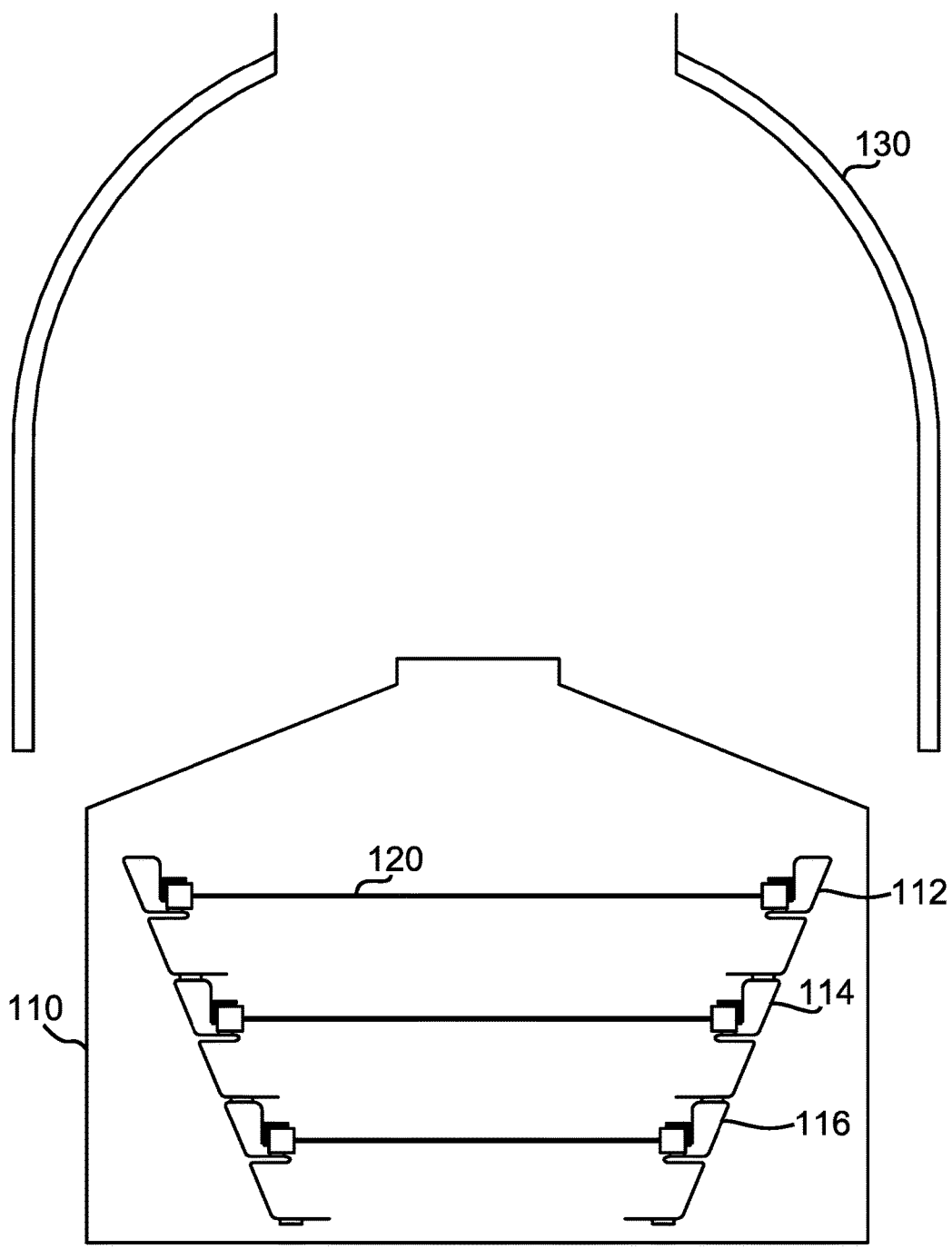
FIG. 1 is a cross section view of the filtering assembly, according to one example embodiment.

FIG. 1 is a cross section view of the filtering assembly. The filter module 110 is an enclosure for the filter trays comprised of a series of various tray sizes, with smaller trays at the bottom of the enclosure, with additional trays graduating in size as the air travels through the filters. At the entrance of the fluid (liquid or gas fluid) into the filter module, the fluid first passes through the smallest or first filter tray 116. Typically this first filter removes the larger particles, grease or other particulates. The fluid then flows through the second filter 114 which performs the second filtering function, removing smaller or finer particles. The air or liquid fluid then flows through the third filter 112 which removes the smallest or finest particles. Filter element 120 may comprise carbon materials, fiberglass, polyester or HEPA type filtering materials. The filter element 120 may be a disposable filter that may be replaced when required.

The filter module 110 is inserted up into the receiving duct 130 as shown in FIG. 1. The receiving duct 130 is funnel shaped, directing the flow of fluid from the filter module up through the small diameter portion of the funnel.

FIG. 2A shows the filter module 110 in place after it has been inserted inside the receiving duct 130.

FIG. 2B shows the filter module 110 after it has been removed from the receiving duct 130 for maintenance and replacement of the filters.

Figure 3:
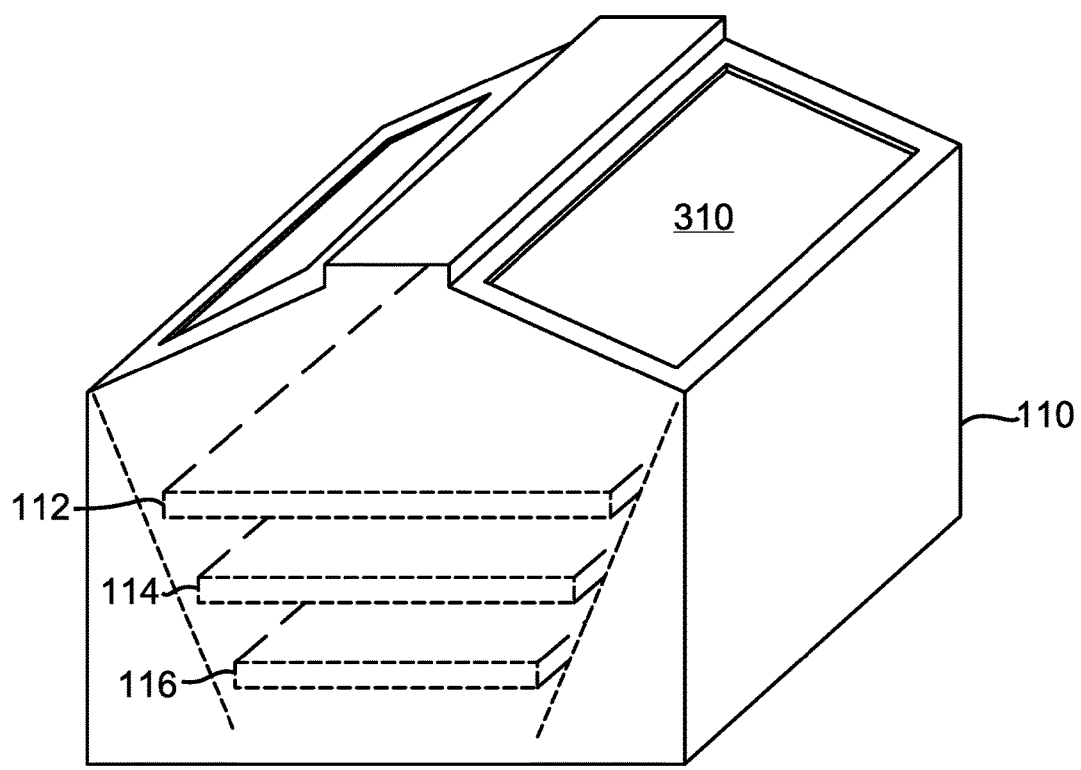
FIG. 3 is an isometric view of the filter module, according to one example embodiment.

FIG. 3 is an isometric view of the filter module 110 showing filter tray 112, filter tray 114 and filter tray 116 inside the module. Opening 310 at the top of the enclosure is large enough to allow the filters to be inserted and removed from the module as required.

Figure 4A:
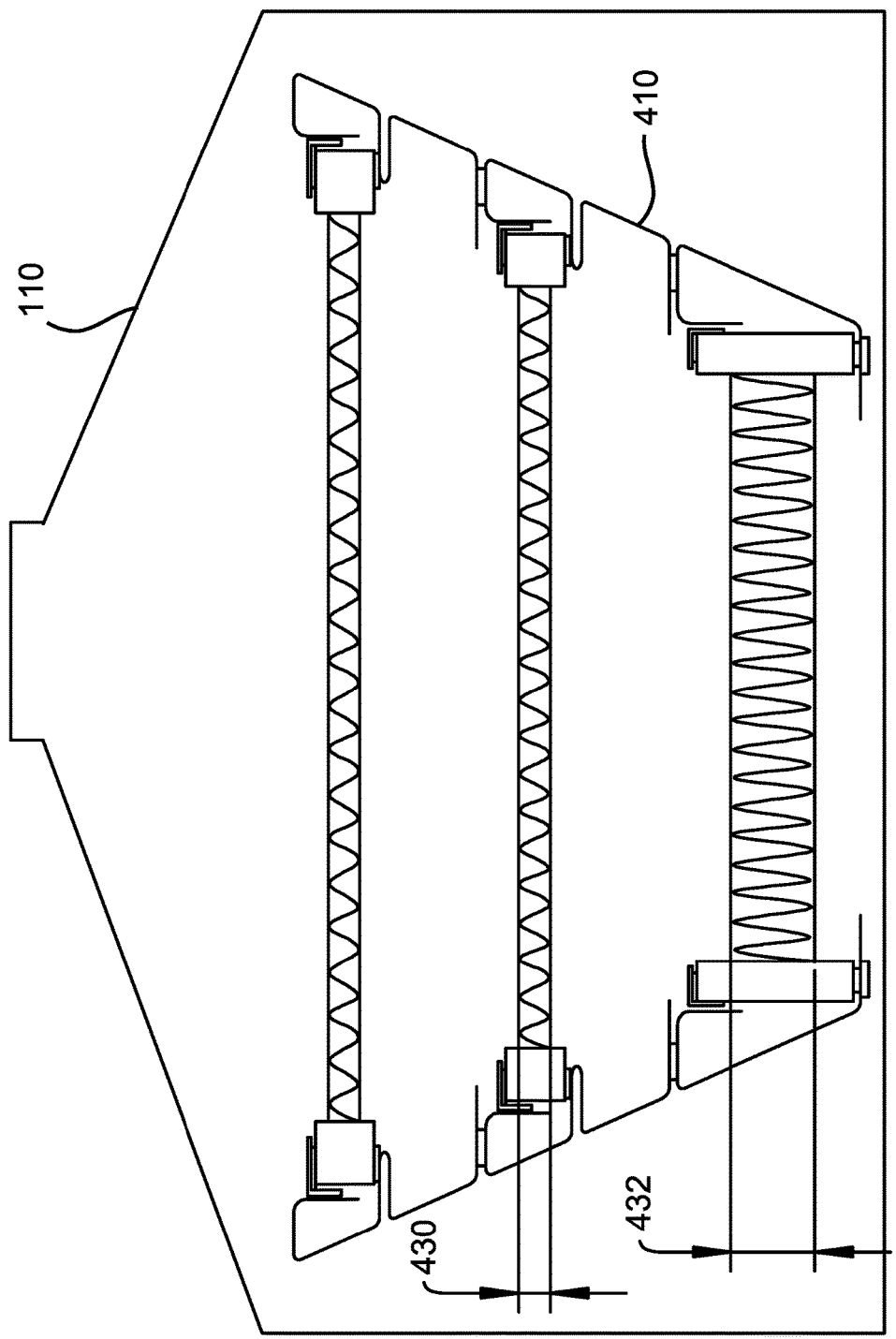
FIG. 4A is a cross section view of the filter module, according to one example embodiment.

FIG. 4A is a cross section view of the filter module 110 showing the first filter tray 410 at the entrance of fluid flow into the module, the first filter tray 410 being deeper than the other filter trays. The depth 432 of filter tray 410 at least 3 times the depth 430 of the other filter trays.

Figure 4B:
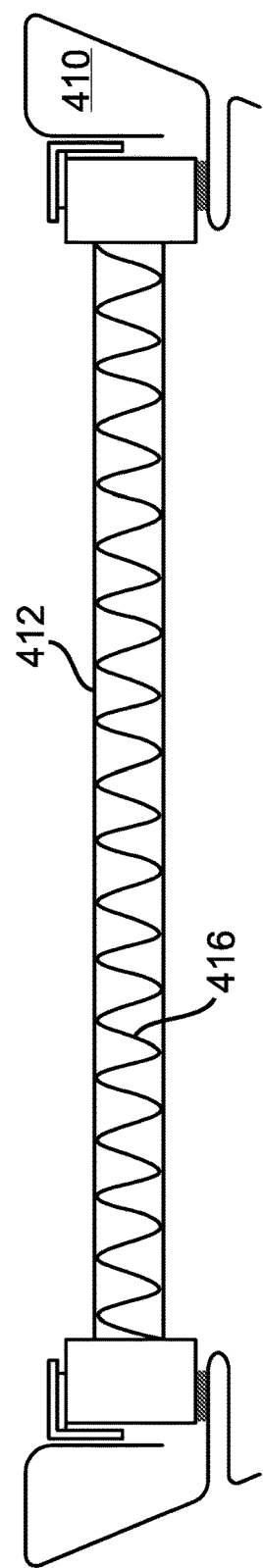
FIG. 4B is a larger scale cross section view of the first filter tray showing detail of the filter element, according to one example embodiment.

FIG. 4B is a larger scale cross section view of the first filter tray 410 showing detail of the filter element 412, with filter media 416 having a larger surface area than the other filters within the filter module.

Figure 4C:
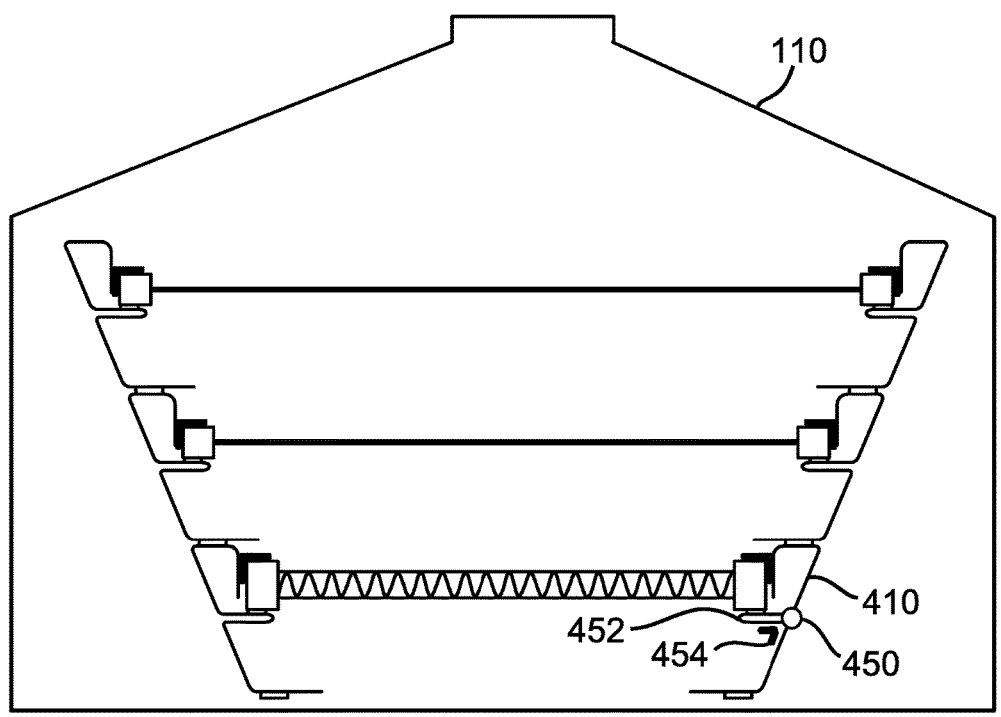
FIG. 4C is a cross section view of the filter module, according to one example embodiment.

FIG. 4C is a cross section view of the filter module 110 showing a supporting frame 452 which attached to the filter frame 410 by hinge 450, and supported by clasp 454. When clasp 454 is released, the supporting frame drops down and allows the removal of the filter element.

Figure 5:
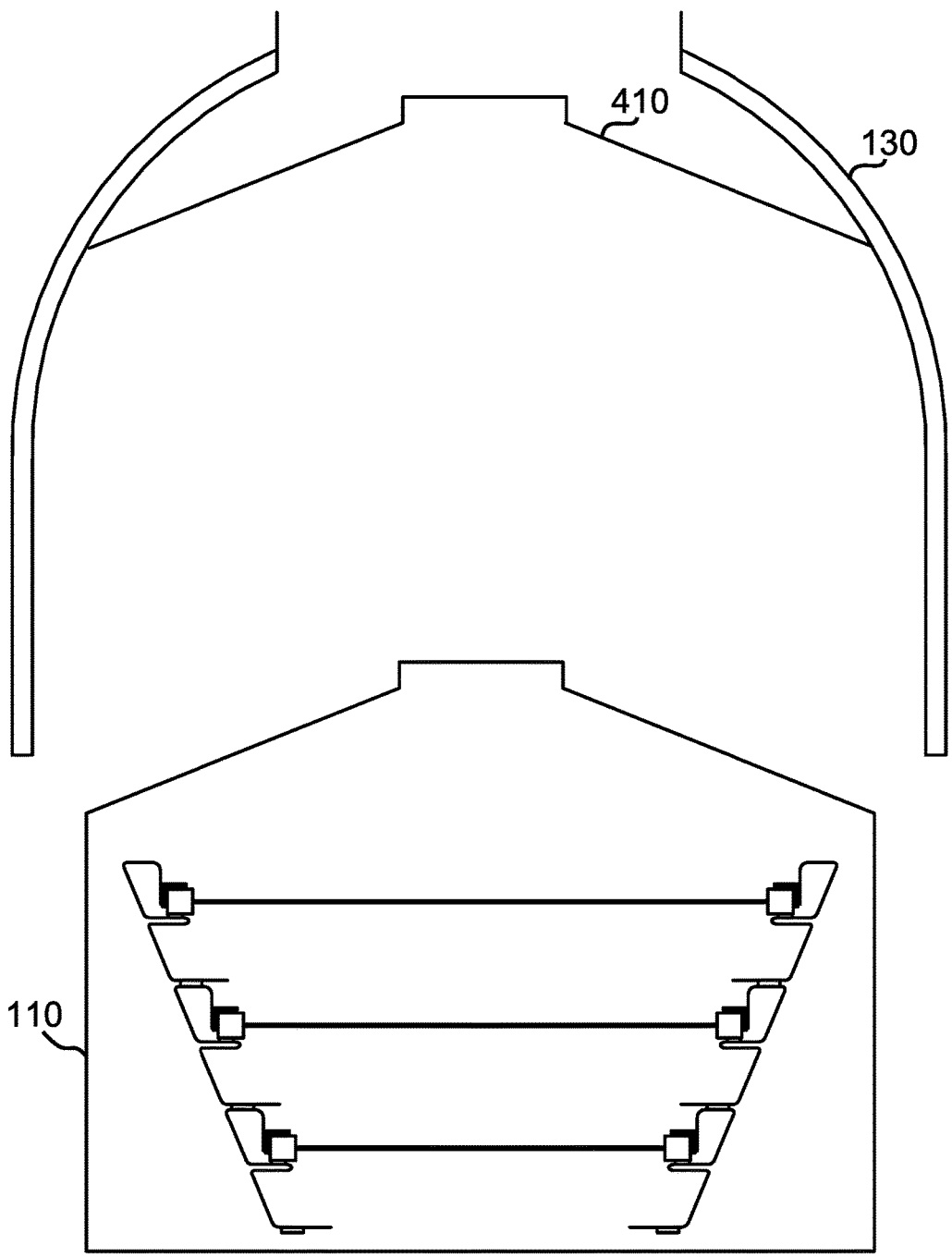
FIG. 5 is a cross section view of the filter module and the receiving duct detailing the gasket interface area between the module and the duct, according to one example embodiment.

FIG. 5 is a cross section view of the filter module 110 and the receiving duct 130 detailing the gasket interface area between the module and the duct. The gasket seal 410 is attached to a surface on the receiving duct 130 of the same shape and size of the interfacing surface of the filter module 110.

Figure 6:
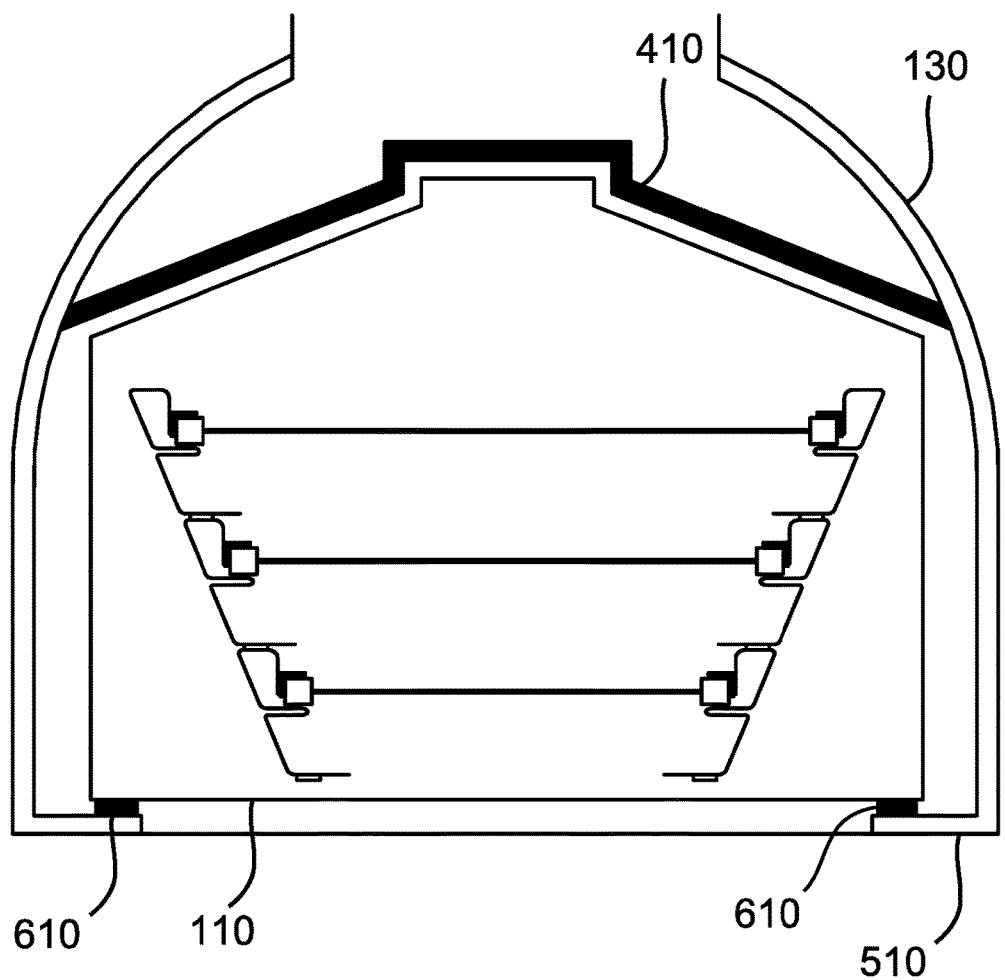
FIG. 6 shows the filter module fully inserted into the receiving duct, according to one example embodiment.

FIG. 6 shows the filter module 110 fully inserted into the receiving duct 130. Adjustable frame 510 supports and creates positive pressure on the filter module 110, pushing it fully into the gasket seal 410 of the receiving duct 130. The adjustable frame 510 can be opened to allow the removal of the filter module. When the filter module is placed inside the receiving duct 130, the adjustable frame is then closed and secured to hold the filter module 110 in place. Gaskets 610 seal the connection between the adjustable frame 510 and the filter module.

Figure 7A:
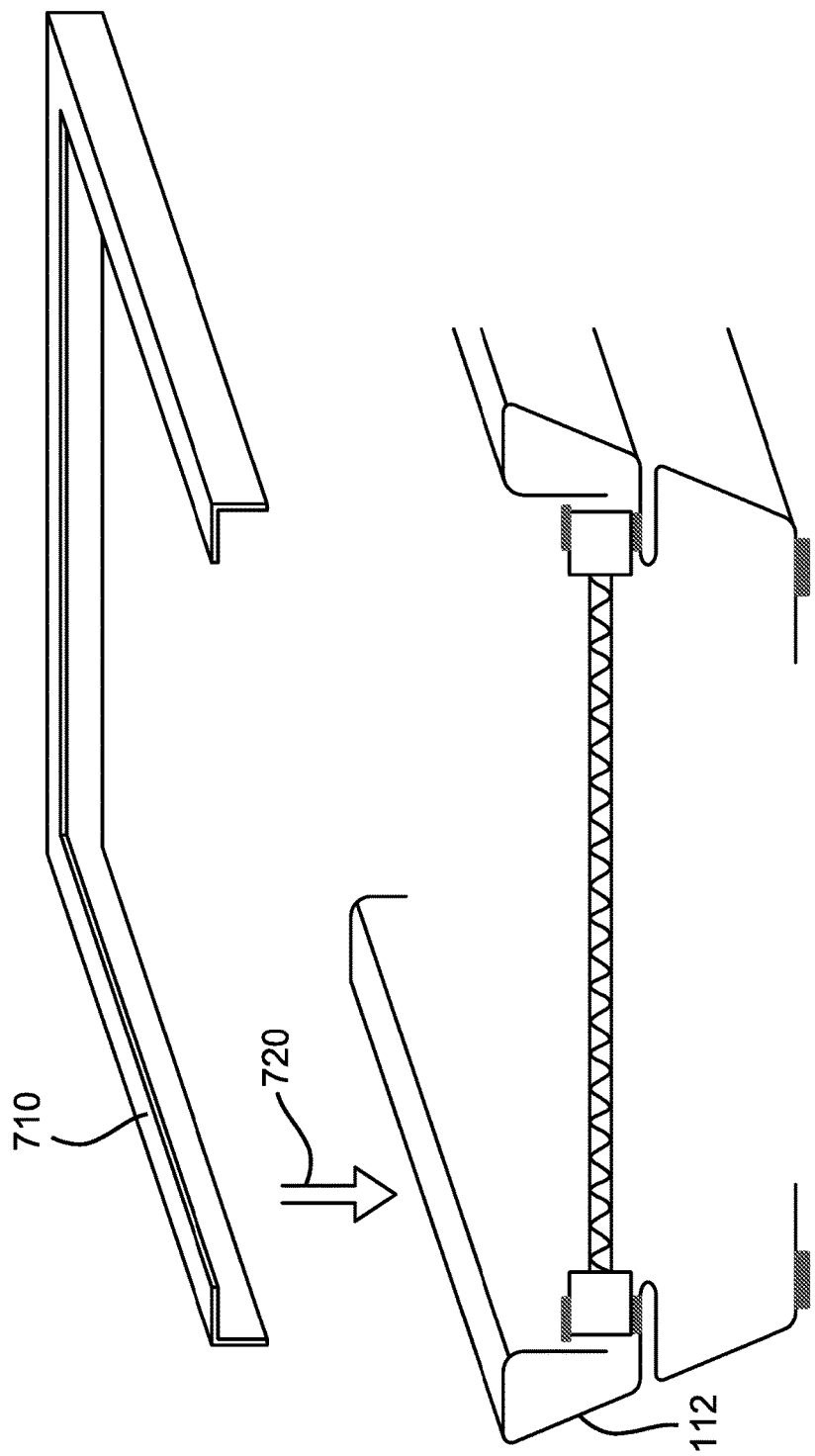
FIG. 7A shows the friction fitted frame above the filter tray prior to being inserted into the filter tray, according to one example embodiment.

FIG. 7A shows the friction fitted frame 710 above the filter tray 112 prior to being inserted into the filter tray 112. The arrow 720 indicates the direction that the friction fitted frame 710 is placed into the filter tray 112.

Figure 7B:
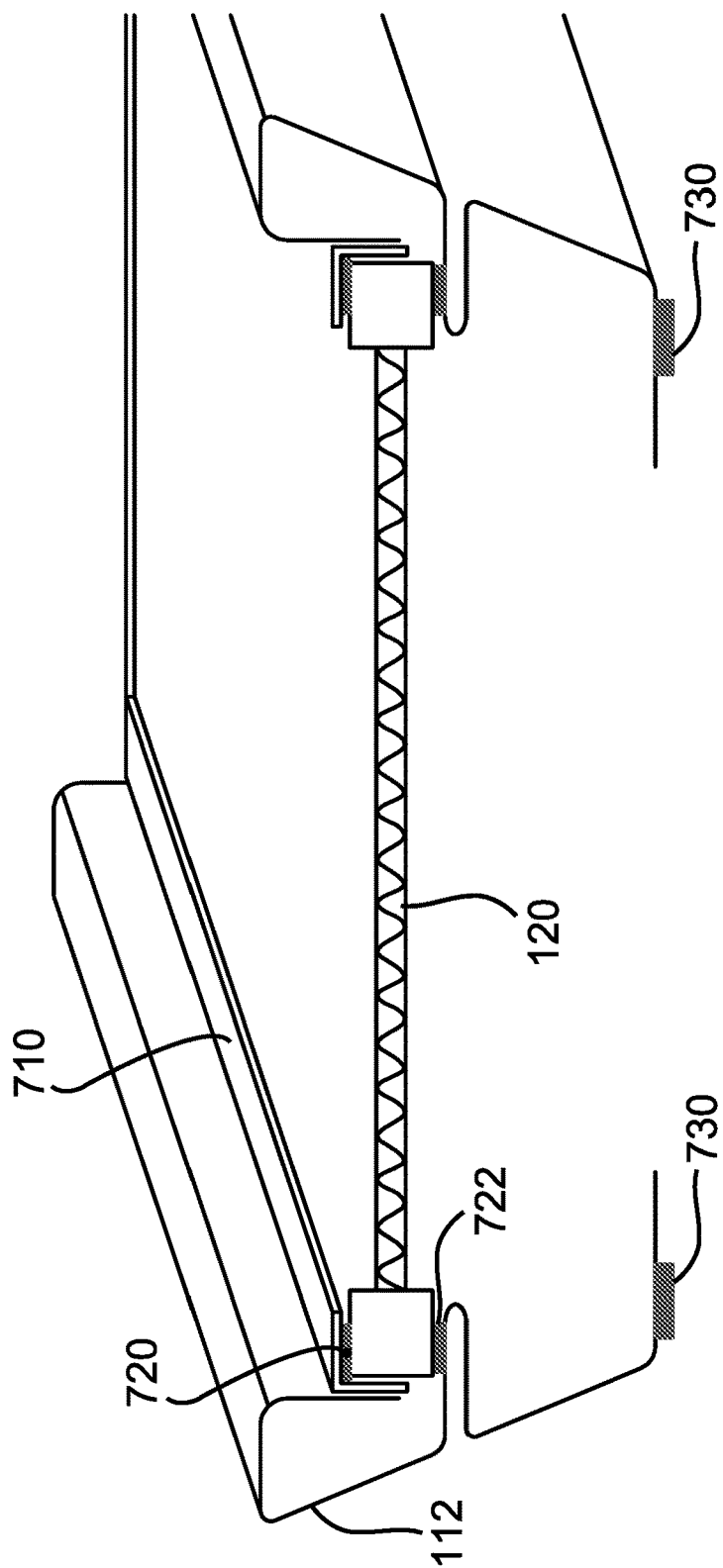
FIG. 7B shows the friction fitted frame fully inserted into the filter tray holding the filter element in place, according to one example embodiment.

FIG. 7B shows the friction fitted frame 710 fully inserted into the filter tray 112 holding the filter element 120 in place. Gaskets 720 and 722 seal the connection between the filter element 120 and the filter tray 112. Gaskets 730 seal the connection between the filter trays.

Figure 8:
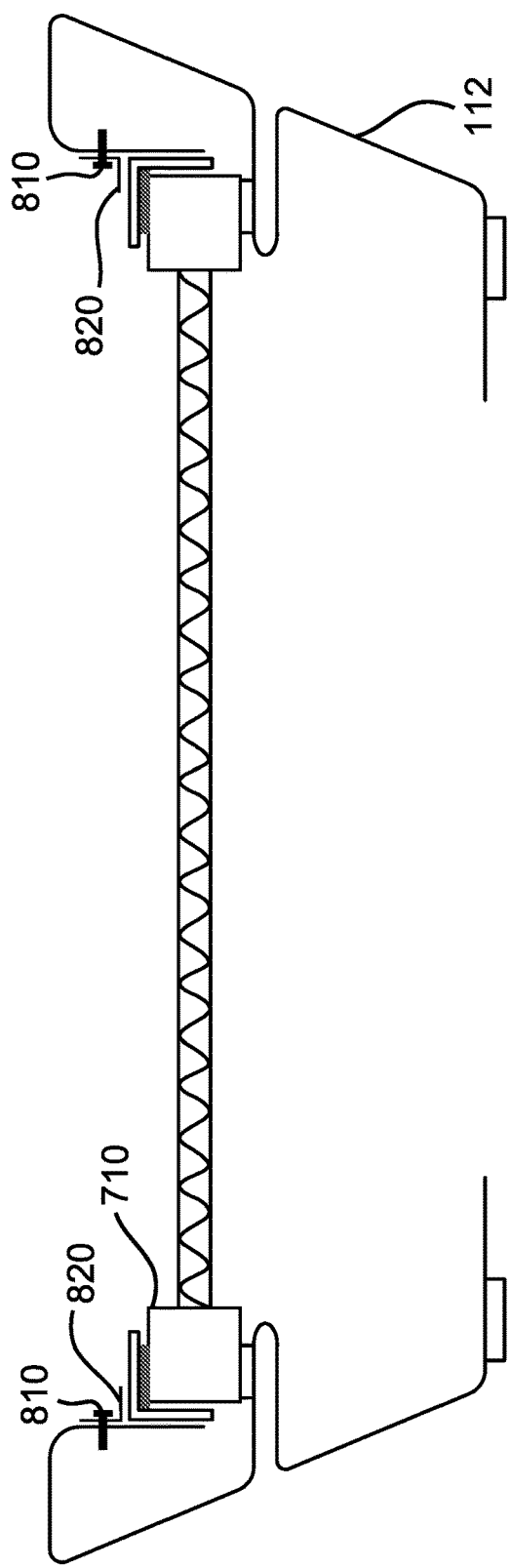
FIG. 8 is a cross section view of the filter tray, according to one example embodiment.

FIG. 8 is a cross section view of the filter tray 112 showing a bracket 820 and screw 810 further securing and holding the friction fitted frame 710 in place.

Figure 9:
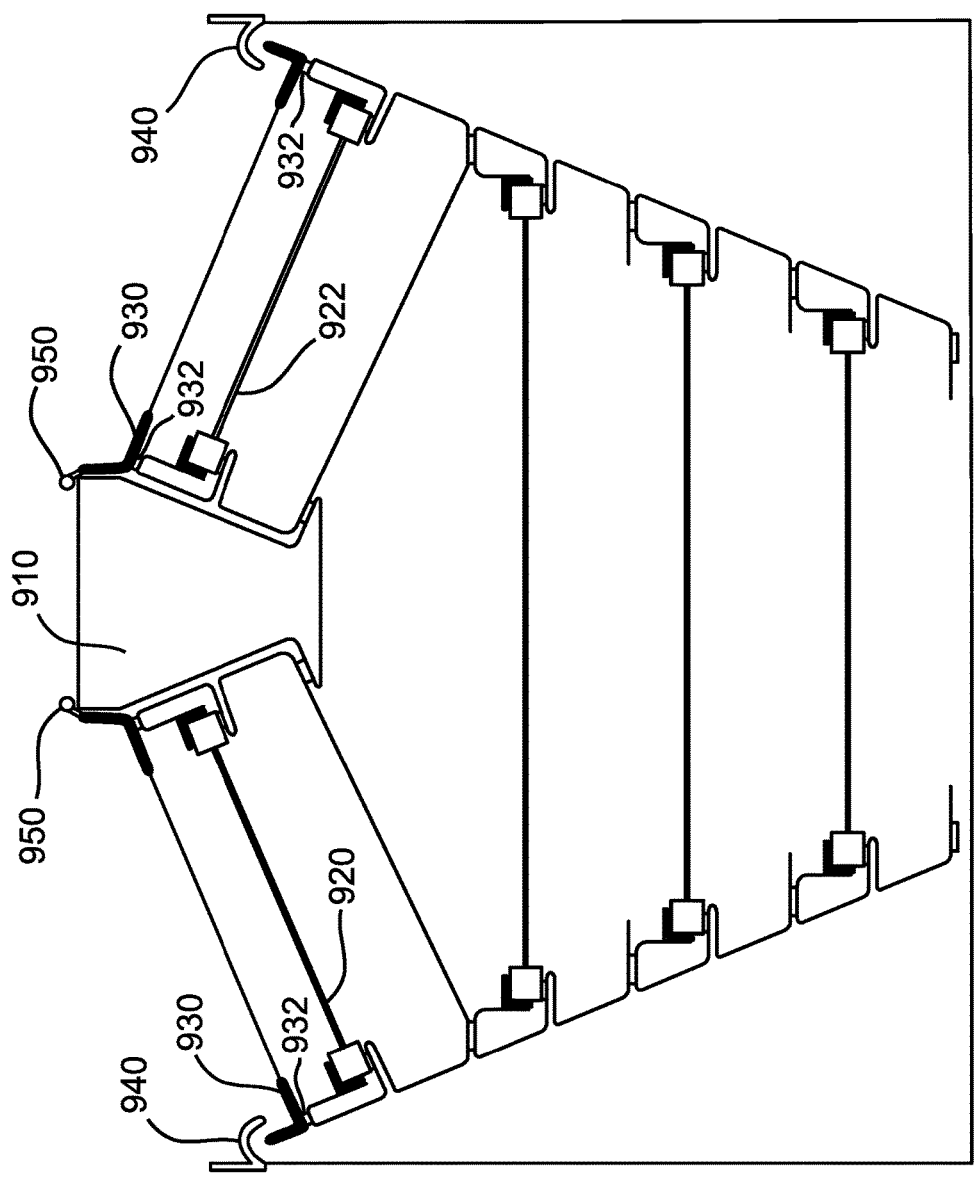
FIG. 9 is a cross section view of the filter module showing the keystone strut channel, according to one example embodiment.

FIG. 9 is a cross section view of the filter module showing the keystone strut channel 910 which holds in the top two filter trays as shown. The filter elements 920 and 922 are secured inside the filter frames in the same way as all the other filters. A clasped framing structure 930 secures the filter trays in place and has gaskets 932 forming a seal between the filter trays and the clasped framing structure 930. The clasped framing structure 930 is attached to the keystone strut channel 910 by hinge 950 and is held tight against the filter frame by clasp 940. In order to remove the filter trays, clasp 940 is released allowing the clasped framing structure to swing open so that the filter trays can be removed.

Figure 10:
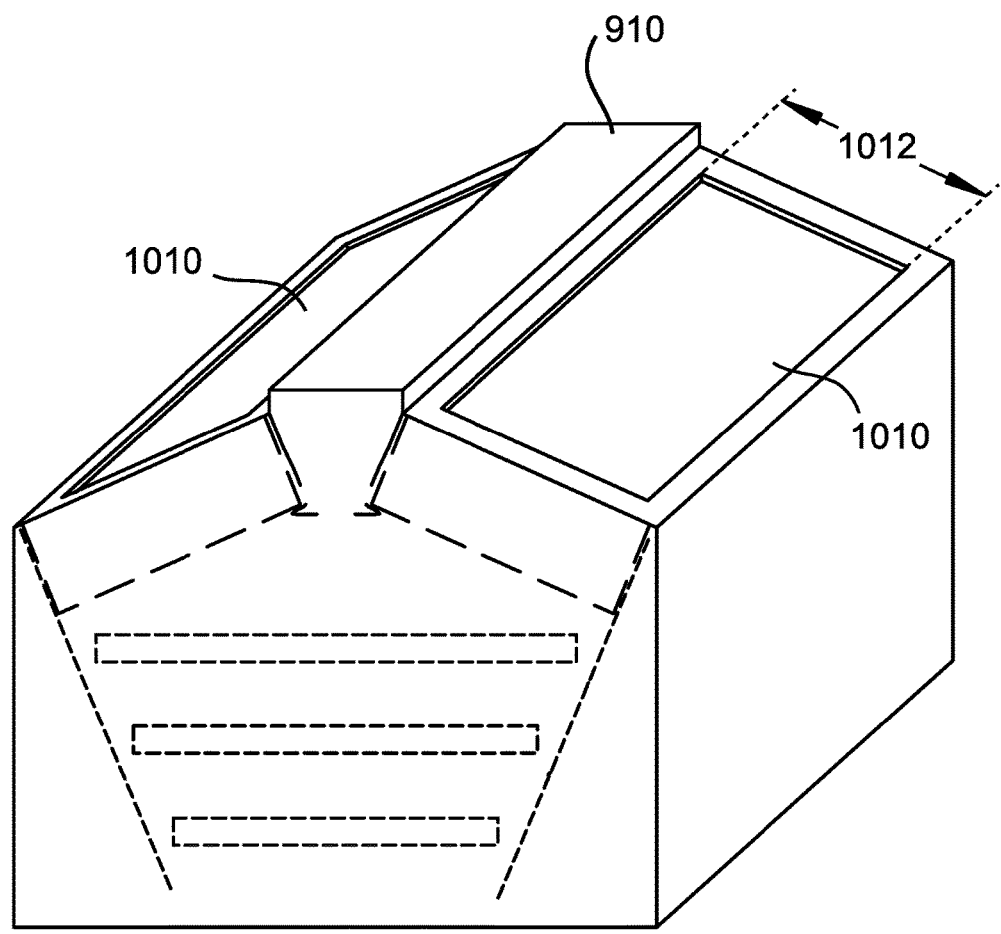
FIG. 10 is an isometric view of the filter module showing the keystone strut channel, according to one example embodiment.
Figure 11:
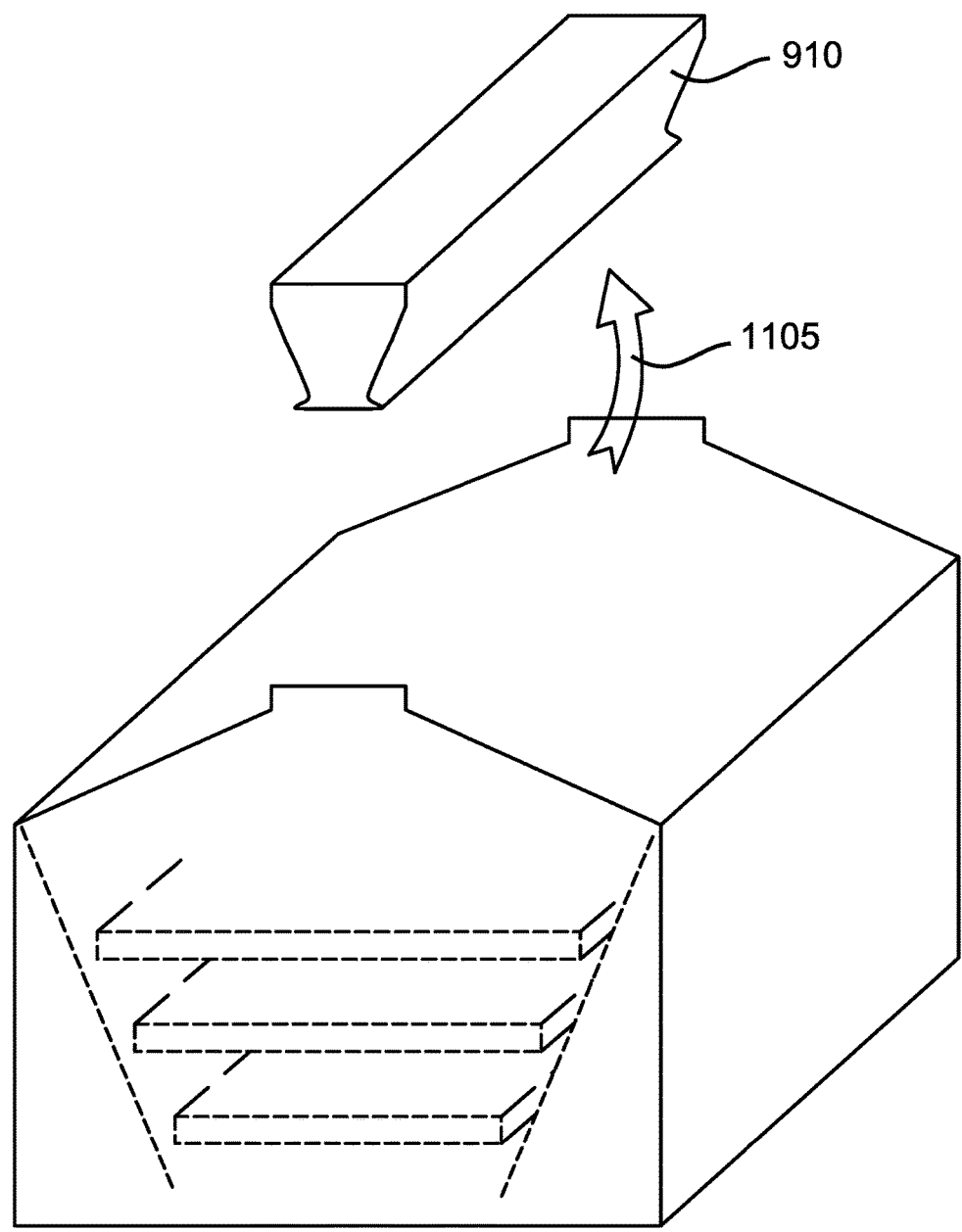
FIG. 11 is an isometric view of another embodiment of the filter module, according to one example embodiment.

FIG. 10 is an isometric view of the filter module showing the keystone strut channel 910 at the top of the module and openings 1010 providing access to the filter trays. The opening dimension 1012 is wide enough to allow the insertion and removal of the trays FIG. 11 is an isometric view of another embodiment of the filter module wherein the keystone strut channel is removed as shown by arrow 1105, leaving the top of the module completely open, allowing access to the filter trays.

Figure 12:
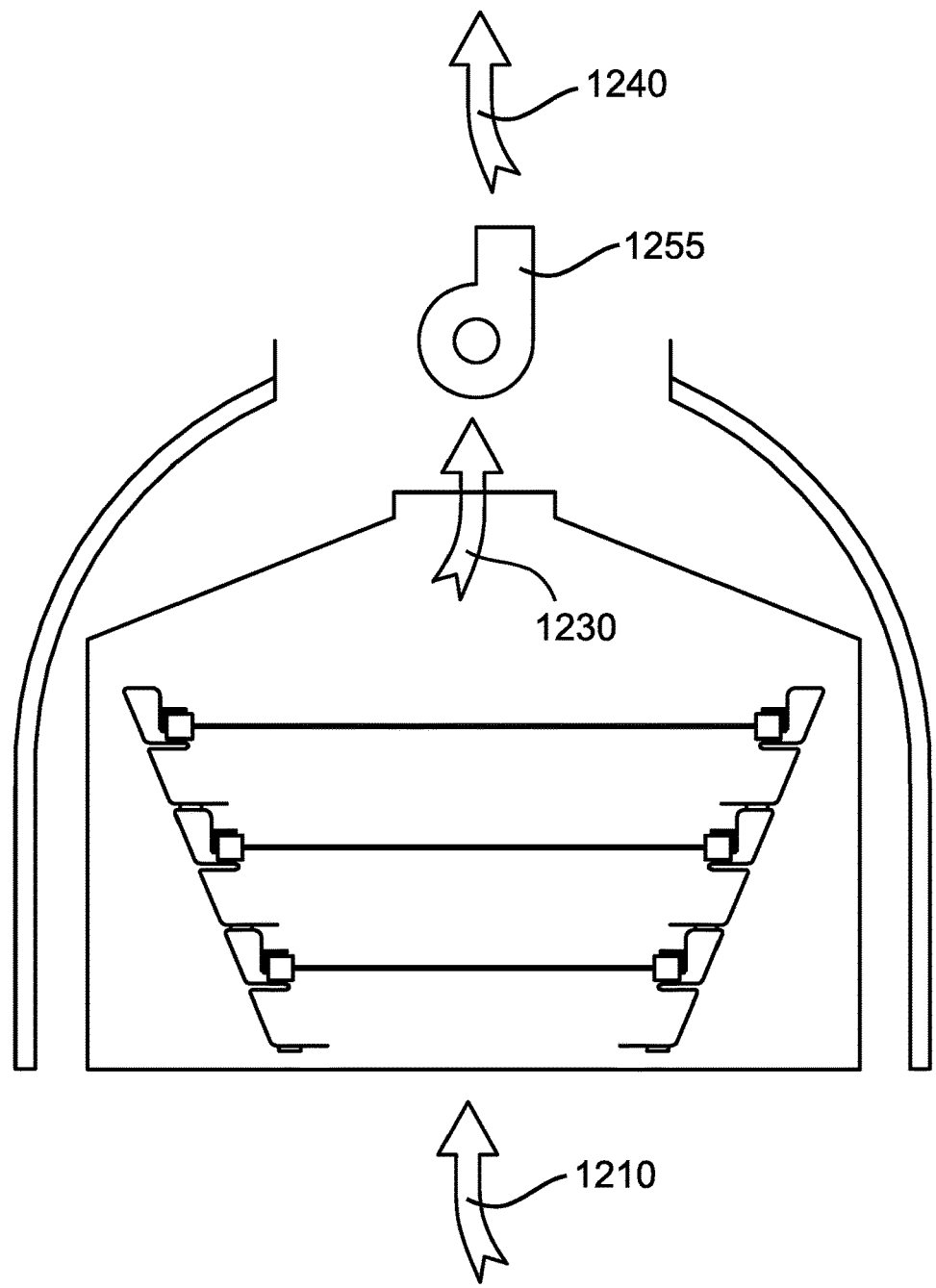
FIG. 12 is a cross section view of the filter module showing fluid flow entering the filter module, according to one example embodiment.

FIG. 12 is a cross section view of the filter module showing fluid flow 1210 entering the filter module, flowing through all of the filters then exiting the top 1230 of the module being driven by a fluid flow driver device 1255, the fluid exiting 1240 the other side of the fluid flow driver device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A filtering assembly comprising:
a filter module; the filter module comprising:
two or more filter trays which each receive insertion of a filter element,
wherein each of the filter trays are of graduated sizes, with larger filter trays stacked on top of smaller filter trays within a filter enclosure; and
a receiving duct which receives insertion of the filter module; and
the receiving duct further comprising:
a tapered, funnel shaped frame at one end of the receiving duct with a gasketed interface surface comprising a non-porous gasket material forming a seal between the funnel shaped frame and the filter enclosure when inserted therein; wherein the filter module is placed into the receiving duct through an opening in the end opposite of the funnel shaped frame and supported by an adjustable frame.

2. The filtering assembly of claim 1, wherein a supporting frame of a first filter element at an entrance of fluid flow into the first filter module comprises:
a hinged support flange which supports the first filter element, supported by a clasp; and
the clasp releasing the support flange allowing it to drop down and allowing the first filter element to be removed and replaced.

3. The filtering assembly of claim 1, wherein
the adjustable frame is adjusted to place pressure on the filter module, forcing it against the funnel shaped frame, forming a seal between the funnel shaped frame and the filter module.

4. The filtering assembly of claim 1, wherein each of the filter trays further comprising:
a friction fitted frame within the filter tray holding the filter element in place, forming a seal between the filter tray and the filter element and adjusting to the filter depth;
gaskets between the filter element and filter tray; and
gaskets between the filter trays.

5. The filtering assembly of claim 4, wherein the friction fitted frame further comprises screws attaching the frame to the filter tray providing a more secure attachment.

6. The filtering assembly of claim 1, wherein the non-porous gasket material comprising materials from the group of one or more materials:
neoprene, silicone, polytetrafluoroethylene, ethylene propylene diene monomer, and polyurethane.

7. The filtering assembly of claim 1, wherein the filter element comprising one or more of:
fiberglass, polyester, HEPA, carbon, membrane, grease, and baffle.

8. The filtering assembly of claim 1, wherein the filter module further comprising:
a keystone strut channel supporting two of the filter trays adjacent to a gasketed interface surface allowing flow through two filters in the two of the filter trays and into a funnel shaped frame; and
wherein the keystone strut channel further comprises:
a clasped framing structure that attaches the filter trays to the filter module;
the clasped framing structure comprising gasket material on a surface contacting the filter trays;
and clasps that secure the clasped framing structure to the filter module.

9. The filtering assembly of claim 8, wherein the keystone strut channel is removeable, facilitating the removal and replacement of filters.

10. The filtering assembly of claim 8, wherein the keystone strut channel is fixed to the filter module.

11. The filtering assembly of claim 8, wherein an opening between the keystone strut channel and the adjacent sides of the filter module is wide enough to allow the removal and replacement of the filter trays inside the filter enclosure.

12. The filtering assembly of claim 1, wherein the receiving duct allows fluid flow into the funnel shaped frame and into a fluid flow driver device.

13. The filtering assembly of claim 12, wherein the fluid flow driver device comprises a pump.

14. The filtering assembly of claim 12, wherein the fluid flow driver device comprises a fan.

15. The filtering assembly of claim 12, wherein the fluid flow driver device is detachable from the funnel shaped frame allowing maintenance of the device.

16. The assembly of claim 1, wherein the one or more filter trays further comprising:
  filters fitting within the one or more filter frames comprising pre-filtration filters in one or more of the frames; and main filtration filters in one or more of the frames.

17. The assembly of claim 1, wherein the one or more filter trays support the insertion of disposable filters allowing filters to be replaced as required.

* * * * *